US006839022B1

(12) United States Patent
Benco et al.

(10) Patent No.: US 6,839,022 B1
(45) Date of Patent: Jan. 4, 2005

(54) NETWORK SUPPORT FOR SUBSCRIBER ACCESS TO MOBILE CALLER LOCATION INFORMATION

(75) Inventors: David S. Benco, Winfield, IL (US); Kevin J. Overend, Elmhurst, IL (US); Baoling S. Sheen, Naperville, IL (US); Kenneth J. Voight, Sugar Grove, IL (US); Sandra Lynn True, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/601,945

(22) Filed: Jun. 23, 2003

(51) Int. Cl.[7] .............................. G01S 5/14; H04Q 7/20; H04M 1/15
(52) U.S. Cl. ............................... 342/357.1; 455/456.5; 379/142.1
(58) Field of Search ........................ 342/357.07, 357.1, 342/357.09, 357.08; 455/456.3, 456.5, 414.2, 456.2; 379/142.1, 142.04, 142.06, 201.06, 201.07, 201.08, 201.12

(56) References Cited

U.S. PATENT DOCUMENTS

| | | | |
|---|---|---|---|
| 5,388,147 A | * 2/1995 | Grimes .................... | 455/404.2 |
| 5,594,425 A | 1/1997 | Ladner et al. ......... | 340/825.49 |
| 5,625,668 A | * 4/1997 | Loomis et al. ........... | 455/456.5 |
| 5,727,057 A | * 3/1998 | Emery et al. .......... | 379/201.07 |
| 5,740,538 A | 4/1998 | Joyce et al. ............. | 455/456.2 |
| 5,771,283 A | * 6/1998 | Chang et al. .......... | 379/142.01 |
| 5,790,074 A | 8/1998 | Rangedahl et al. .... | 342/357.13 |
| 5,875,401 A | * 2/1999 | Rochkind .................... | 455/466 |
| 6,075,458 A | 6/2000 | Ladner et al. ......... | 340/825.49 |
| 6,085,097 A | 7/2000 | Savery et al. ............ | 455/456.1 |
| 6,185,426 B1 | * 2/2001 | Alperovich et al. ..... | 455/456.1 |
| 6,310,944 B1 | 10/2001 | Brisebois et al. ...... | 379/142.01 |
| 6,609,005 B1 | * 8/2003 | Chern ........................ | 455/457 |
| 2003/0016804 A1 | * 1/2003 | Sheha et al. ........... | 379/201.06 |

FOREIGN PATENT DOCUMENTS

| | | | | |
|---|---|---|---|---|
| EP | 0 920 169 A1 | * 6/1999 | ............ | H04M/1/57 |
| EP | 0 924 917 A2 | * 6/1999 | ............ | H04M/3/42 |
| GB | 2 215 932 A | * 9/1989 | ............. | G01S/5/14 |

* cited by examiner

Primary Examiner—Gregory C. Issing (57) ABSTRACT

Geographic coordinates of user equipment of a calling party are determined either by communicating with a GPS receiver associated with the user equipment of the calling party or by cellular triangulation. The geographic coordinates may be converted into an associated common location description. For example the common location description is a city name, an address, or a distance and direction from a landmark. The common location description, or an abbreviation thereof, is transmitted to user equipment of a called party. Using this service, parents may verify the location of their children. Security agencies or delivery services may verify and/or log the location of their personnel.

34 Claims, 4 Drawing Sheets

NETWORK SUPPORT FOR SUBSCRIBER ACCESS TO MOBILE CALLER LOCATION INFORMATION

BACKGROUND OF THE INVENTION

The present invention is directed to the art of providing information about calling parties to called parties. More particularly, the present invention is directed to systems and methods for providing location information regarding a calling party to the called party where the calling party is using mobile user equipment such as a mobile or cellular phone, personal digital assistant (PDA) or other device.

In the United States, the Federal Communications Commission (FCC) is requiring wireless carriers to be able to locate users on their network when they make a 911 emergency call. Regulations in this area are referred to generally as Enhanced 911 or E911. As a result, various user locating technologies have been, and are being, implemented in wireless communications networks.

For example, some user equipment, such as, mobile phones and personal digital assistance (PDAs) include global positioning system receivers and can provide GPS coordinates of the user equipment to the mobile network over which they communicate. Other locating systems do not rely on GPS technology.

Instead, cellular triangulation techniques are used. Some cellular triangulation techniques measure the signal strength of the target piece of user equipment at, for example, three or more cell sites, and use those measurements to determine a distance to the user equipment from each of the cell sites. Other cellular triangulation techniques are based on a measurement of time delays of signals transmitted from the user equipment to the plurality of cell sites. The time delays are used to calculate distances. Additionally, or alternatively cellular triangulation can include the use of directional antennas. By rotating a directional antenna and monitoring the strength of signals from the user equipment an antenna orientation associated with a strongest or weakest signal strength can be determined. That antenna orientation is associated with a direction to the user equipment. By projecting vectors from two or more cell sites toward the user equipment an intersection of the vectors can be found. The intersection of the vectors is the location of the user equipment.

Location information regarding calling parties can be useful in situations beyond the 911 emergency call scenario. For example, where lost travelers call someone at their desired destination in order to receive new or updated directions, it can be useful to provide the called party with accurate location information regarding the lost travelers so that specific and customized directions can be provided. Caller location information can also be useful where there is a need or desire to verify the location of the calling party. For example, parents may want to verify the location of their children. Dispatchers may want to verify or accurately determine the location of security or delivery personnel. Parole officers can use location information to determine whether or not parolees checking in by phone are within prescribed boundaries.

Therefore, there is a desire to provide location information regarding calling parties to called parties on a more general basis than is currently available.

SUMMARY OF THE INVENTION

A method operative to include caller location information in information made available to user equipment of a called party includes receiving a call request from the calling party, extracting called party identification information from the call request, determining that the called party subscribes to a caller location service based on the extracted called party identification information, determining a latitude and longitude of the calling party, determining a common description of a location of the calling party based on the latitude and longitude, including the common description of the location of the calling party in a message, and transmitting the message to the user equipment of the called party.

Determining that the called party subscribes to a caller location service can include accessing user subscription information of a subscriber database of the called party.

Determining a latitude and longitude of the calling party can include determining that the user equipment of the calling party includes a GPS receiver and requesting GPS coordinates from the user equipment of the calling party. Alternatively, determining a latitude and longitude of the calling party can include requesting coordinates of the calling party user equipment be determined by cellular triangulation.

Determining a common description of a location of the calling party can include receiving GPS coordinates and using the GPS coordinates as an index into a common location description database to determine at least one of an address, a city name, and a distance and heading from a landmark. Alternatively, determining a common description of a location of the calling party can include receiving coordinates based on cellular triangulation and using the coordinates as an index into a common location description database to determine at least one of an address, a city name, and a distance and heading from a landmark.

Where providing location information of a calling party is an optional service, the method can include verifying that the calling party is included in a list of potential calling parties for which the called party desires location information.

Some embodiments include a method operative to provide caller location information to user equipment of a called party. The method includes receiving a call request from the calling party, extracting called party identification information from the call request, determining that the called party subscribes to a caller location service based on the extracted called party identification information, determining if the user equipment of the calling party is GPS enabled, requesting GPS coordinates from the user equipment of the calling party if the user equipment of the calling party is GPS enabled, requesting cellular triangulation services be used to generate location information regarding the user equipment of the calling party if the user equipment of the calling party is not GPS enabled, determining a common description of a location of the calling party based the GPS coordinates or the generated location information, including a representation of the common description of the location in a caller ID field of a message, and transmitting the message to the user equipment of the called party.

Some of those embodiments include extracting calling party user equipment identification information from the call request, retrieving a list of potential calling party user equipment for which the called party desires location information, comparing the extracted calling party user equipment identification information to entries in the list of potential calling party user equipment, and determining that one of the entries in the list matches the extracted calling party user equipment identification information.

Determining that the called party subscribes to a caller location service based on the extracted called party identification information can include querying a subscriber database associated with the called party, and retrieving location feature subscription information regarding the called party.

Determining if the user equipment of the calling party is GPS enabled can include extracting calling party user equipment identification information from the call request, retrieving a list of potential calling party user equipment for which the called party desires location information, the list including GPS enablement status information regarding the potential calling party user equipment. Alternatively, determining if the user equipment of the calling party is GPS enabled can include sending a GPS enablement query message to the user equipment of the calling party.

Requesting cellular triangulation services can include transmitting a plurality of Pilot Strength Measurement (PSM) data collection messages to a respective plurality of cell sites within range of the user equipment of the calling party.

A system operative to include caller location information in information made available to user equipment of a called party includes means for receiving a call request from the calling party, means for extracting called party identification information from the call request, means for determining that the called party subscribes to a caller location service based on the extracted called party identification information, means for determining a latitude and longitude of the calling party, means for determining a common description of a location of the calling party based on the latitude and longitude, means for including the common description of the location of the calling party in a message, and means for transmitting the message including the appended common description of the location to the user equipment of the called party;

Some embodiments also include means for transmitting a first PSMM_Request message from a first cell site to the user equipment of the calling party, means for transmitting a first response to the first PSMM_Request message, means for determining a first delay from the first response, means for transmitting a second PSMM_Request message from a second cell site to the user equipment of the calling party, means for transmitting a second response to the second PSMM_Request message, means for determining a second delay from the second response, means for transmitting a third PSMM_Request message from a third cell site to the user equipment of the calling party, means for transmitting a third response to the third PSMM_Request message, means for determining a third delay from the third response, and means for determining a relative position of the user equipment of the calling party to the first, second and third cell sites based on the first, second and third delays.

Some embodiments include means for transmitting a plurality of PSMM_Request messages from a plurality of cell sites to the user equipment of the calling party, means for transmitting a plurality of responses to the plurality of PSMM_Request messages, means for determining a plurality of delays from the plurality of responses, and means for determining a relative position of the user equipment of the calling party to the plurality of cell sites from the plurality of delays.

Additionally, some embodiments include means for calculating an absolute position of the user equipment of the calling party from the relative position of the user equipment and known positions of the first second and third cell sites.

Where providing location information of a calling party is an optional service, embodiments can include means for verifying that the calling party is included in a list of potential calling parties for which the called party desires location information.

Some systems include a mobile switching center operative to provide calling party location information to user equipment of a called party. The mobile switching center includes a coordinate determiner operative to determine geographic coordinates of user equipment of a calling party, a coordinate converter operative to determine a common description of a geographic location associated with the geographic coordinates determined by the coordinate determiner, and a network interface operative to transmit the common description to the user equipment of the called party.

For example, the coordinate determiner can include a GPS coordinate determiner operative to send a request for GPS coordinates to the user equipment of the calling party and receive GPS coordinates from the user equipment of the calling party. Additionally, or alternatively, the coordinate determiner can include a cellular triangulator operative to coordinate the collection of measurements associated with the user equipment of the calling party and the calculation of geographic coordinates associated with the location of the user equipment of the calling party based on the collected measurements. Some cellular triangulators are operative to collect the measurements associated with the user equipment through the transmission of a plurality of PSM messages.

DESCRIPTION OF THE DRAWINGS

The invention may take form in various components and arrangements of components, and/or in various procedures and arrangements of procedures. The drawings are only for purposes of illustrating preferred embodiments. They are not to scale, and are not to be construed as limiting the invention.

DETAILED DESCRIPTION OF THE PREFERRED EMBODIMENTS

Figure 1:
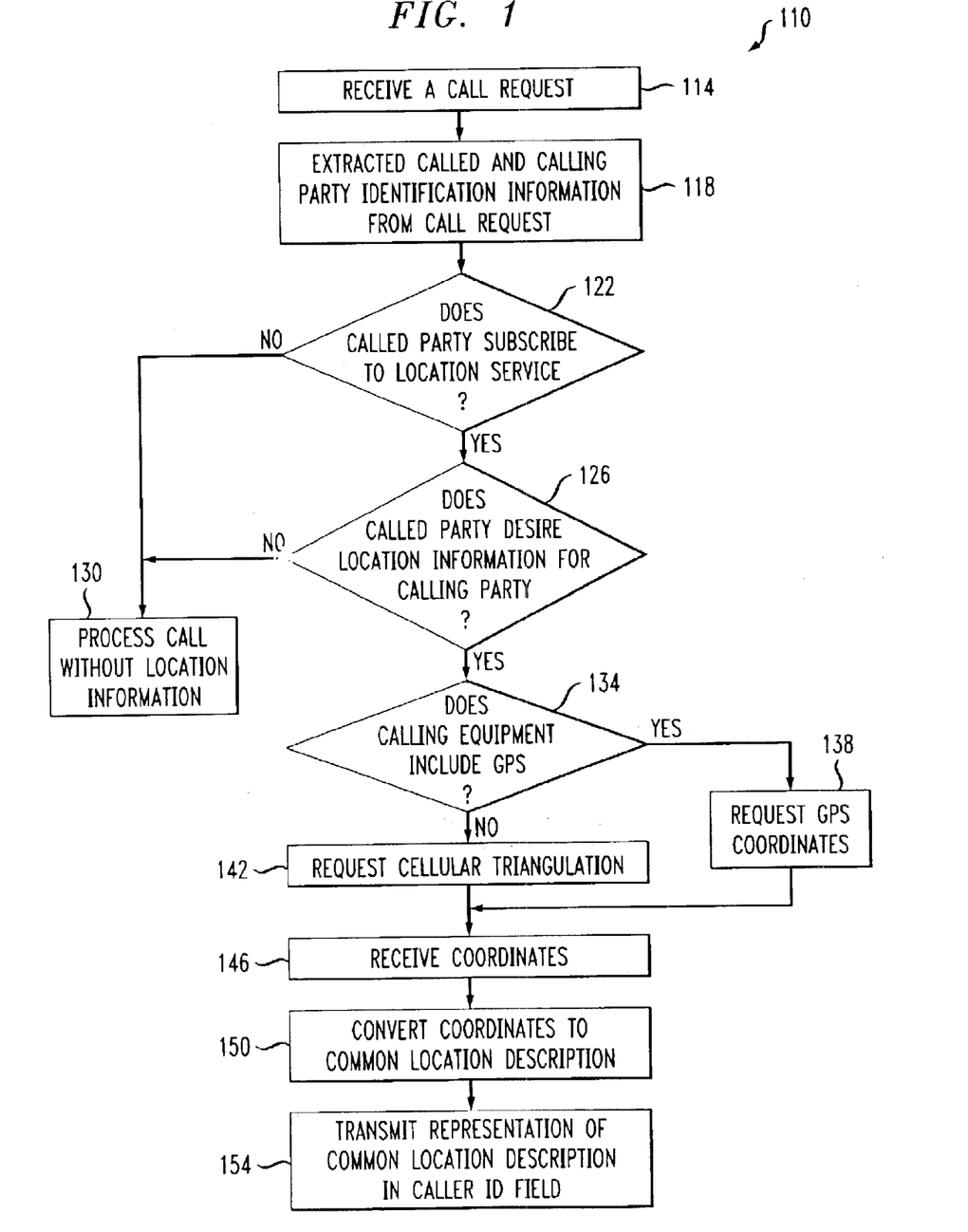
FIG. 1 is a flow chart outlining a method for providing location information regarding mobile user equipment of a calling party to user equipment of a called party.

Referring to FIG. 1, a method 110 for providing caller location information to user equipment of a called party begins with the reception on 114 of a call request. If caller location information is to be provided only under certain circumstances, tests may be performed to determine if the circumstances are met. For example, called party and calling party identification information may be extracted 118 from the received call request. A determination 122 can be made as to whether the called party subscribes to a caller location service. If the called party does subscribe to a location service a determination 126 can be made as to whether the called party desires location information for the calling party. If 122 the called party does not subscribe to the location service or if 126 the called party does subscribe to a location service but does not subscribe to location information for the calling party, the call is processed 130 without further concern for location information.

If a determination 122, 126 is made, that location information is to be provided to the called party. The method 110 includes determining a location of the calling party. For example, a determination 134 is made as to whether or not user equipment of the calling party includes Global Positioning (GPS) equipment. If 134 the user equipment of the calling party does include a GPS receiver, a request 138 is made of the user equipment for the current GPS coordinates of the user equipment. If the user equipment of the calling party does not include a GPS receiver, a request 142 is made for cellular triangulation of the calling parties user equipment. By one method or another, location information or coordinates regarding the calling party or the user equipment of the calling party is received 146.

The received coordinates are converted 150 into a more common location description. The common location description, or some representation or abbreviation thereof is then transmitted 154 to the user equipment of the called party. For example, a street address, a city name, or other location description or an abbreviation therefore is included in a caller ID field of a message transmitted to the user equipment of the called party. The user equipment of the called party may then display, read via voice synthesis, log or otherwise process the location description as desired by the called party.

Extracting 118 called and/or calling party identification information can include for example extracting caller ID information to identify the calling party. The directory number of the called party can act as an identifier of the called party. Additionally, or alternatively, other identifiers can be used, such as, for example, Mobile Identification Numbers or Electronic Serial Numbers.

The called party identification information can be used to determine 122 whether or not the called party subscribes to the location service. For instance, a directory number of the called party can be used as an index into a subscriber database containing subscriber service subscription information. For example, the subscription information of the called party may indicate that location information is desired for everyone that calls the called party. Alternatively, the subscriber database may include a list of specific individuals or specific user equipment for which location information is desired. For example, the list may include a plurality of directory numbers, Mobile Identification Numbers (MINs) and/or Electronic Serial Numbers (ESNs) for which location information is to be collected. The extracted 118 calling party identification information can be compared to the listed party or user equipment identification information to make the determination 126 as to whether the called party desires location information with regard to the calling party. For instance, parents may only be interested and therefore may only subscribe for location information with regard to their children or the cell phones of their children. A delivery service may only list user equipment associated with delivery vehicles or delivery personnel.

The location or coordinate information received 146 may be in any convenient format. For example, location information may be received 146 in the form of latitude and longitude. If necessary, conversion 150 of the location information may be performed by network elements. For example, a Mobile Switching Center (MSC) or visitor location/home location register (VLR/HLR) may house a location look-up database including, for example, common descriptors such as addresses, street names, city names and/or landmark names for a geographic area local to the Mobile Switching Center. Alternatively, a more central location look-up database can include common location descriptors for a much wider area, such as, for example, an entire state, country, continent or for the whole world. Independent of the database configuration or dissemination, the received 146 location information is used as an index or key into an appropriate location look-up database to determine or retrieve the common descriptor for the location of the user equipment of the calling party.

The common location description can then be transmitted 154 to the user equipment of the called party. For example, the location descriptor may be appended to, or included instead of, the caller ID information.

Figure 2:
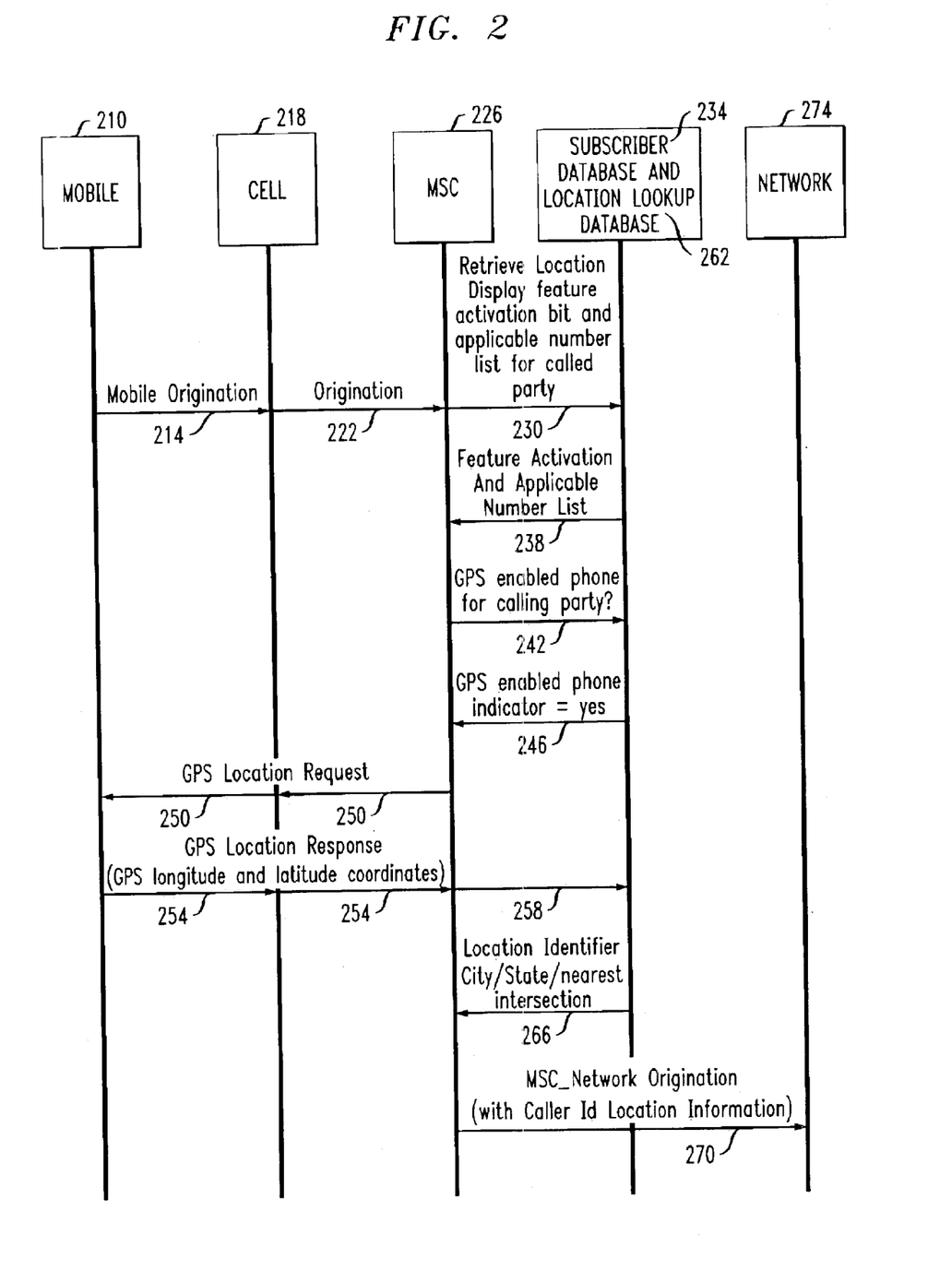
FIG. 2 is a call flow diagram outlining aspects of an embodiment of the method of FIG. 1 where the user equipment of the calling party includes a GPS receiver.

For example, referring to FIG. 2, in a first scenario, a calling party places a call using mobile user equipment 210 such as a cellular phone or personal digital assistant. The user equipment 210 issues a mobile origination message 214 to a serving cell site 218. The cell site 218 relays content of the mobile origination message 222 to a Mobile Switching Center 226. The Mobile Switching Center (MSC) 226 receives 114 the origination call message or request 222 and extracts 118 called and calling party identification information from the call request 222. The Mobile Switching Center 226 sends appropriate messages 230 to a subscriber database 234. The subscriber database 234 is included, for example, in a Visitor Location Register/Home Location Register (VLR/HLR). For instance, the message 230 requests the state of a location display feature activation bit associated with the called party identification information. Additionally, the message 230 requests a list of directory numbers or other calling party identifiers for which the called party desires location information. The subscriber database 234 responds with a message 238 including the state of the location display feature activation bit and, if applicable, the list of devices for which the called party desires location information. The MSC 226 examines the information contained in the response 238 to determine 122 if the call party subscribes to the location display feature and if the called party does subscribe to the feature determines 126 if the mobile user equipment 210 of the called party is included in the list of devices for which the called party desires location information.

If identification information associated with the mobile device 210 is included in the list of devices for which location information is desired, the MSC 226 determines 134 whether or not the mobile device 210 can provide GPS location information. For example, the MSC 226 sends a GPS enable inquiry message 242 to the subscriber database 234 in association with identification information associated with the mobile user equipment 210. For instance, the GPS enable inquiry 242 includes a directory number, an MIN and/or ESN of the mobile device 210. Alternatively, information regarding whether or not the mobile devices are GPS enabled is included in the list provided in the response message 238. In a further alternative, the GPS inquiry is sent to the mobile user equipment 210.

In any event, if the mobile user equipment 210 is GPS enabled, an indication 246 thereof is sent to the MSC 226. In that case, the MSC 226 requests 138 current GPS coordinates from the mobile user equipment 210. For example, the MSC 226 sends a GPS location request message 250 to the serving cell site 218. The cell site 218 relays the location request 250 to the mobile device 210. The mobile device 210 transmits a GPS location response message 254 including, for example, latitude and longitude coordinates to the cell site 218. The cell site 218 relays the location response 254 to the MSC 226. The MSC 226 may then send a location conversion request message 258 to a common location description look-up database 262. For example, the location look-up database 262 may also be housed in a VLR/HLR. Alternatively, the location look-up database 262 is local to the MSC 226 or is part of a remote network adjunct. The location look-up database 262 provides a common description for the location associated with the coordinates received in the location response message 254. For example, the location look-up database 262 transmits a location identifier message 266 including a city name, state name, street address, nearest intersection, distance and direction from a landmark or an abbreviation therefore. The MSC then includes the common location description when an MSC_Network Origination message 270 is sent via a communications network 274 to the user equipment of the called party. For example, the common location description is included in a caller ID field of the MSC_Network Origination message 270 either in addition to or in place of the standard caller ID information.

Figure 3:
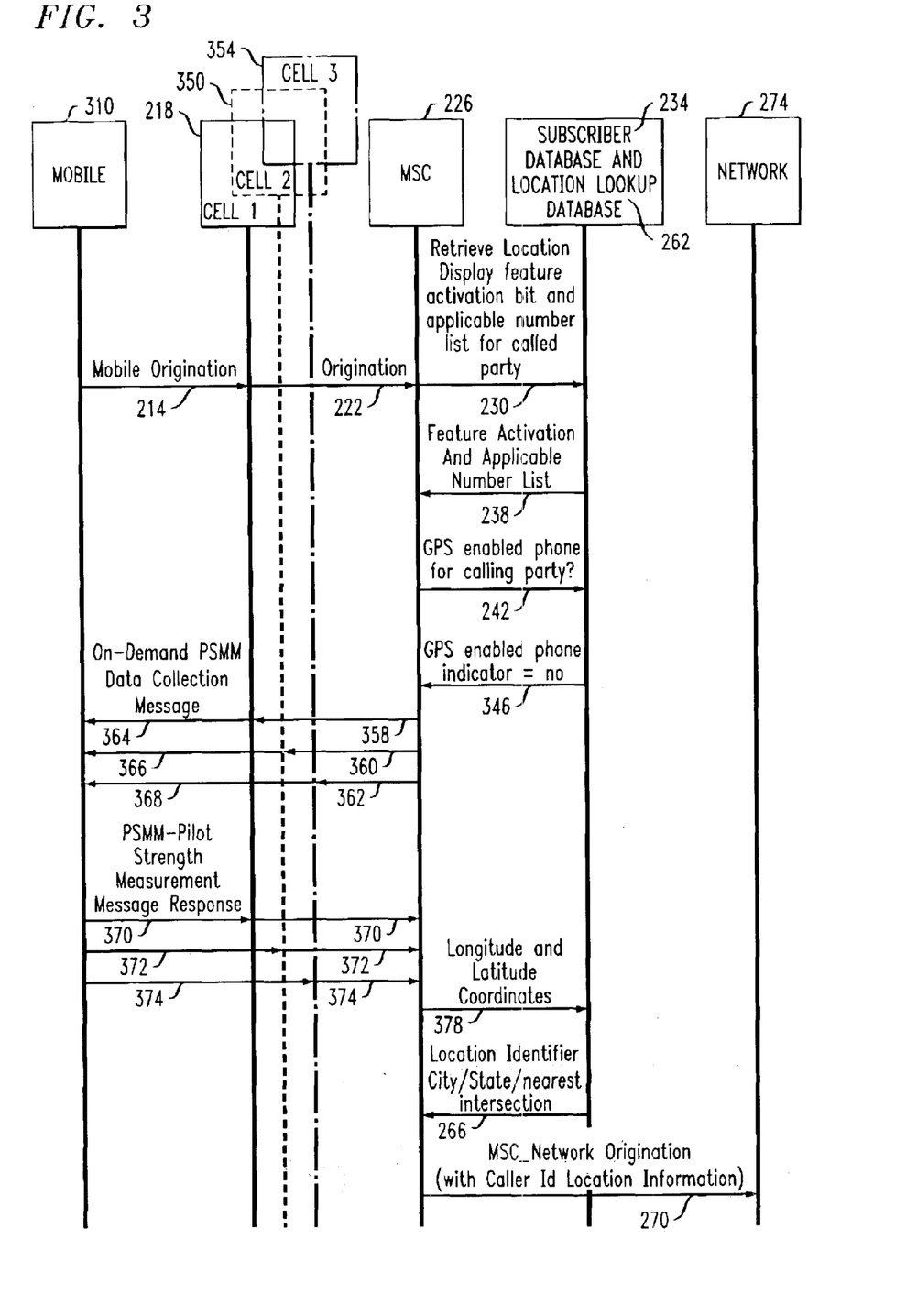
FIG. 3 is a call flow diagram outlining aspects of an embodiment of the method of FIG. 1 where the user equipment of the calling party is not GPS enabled.

Referring to FIG. 3, if a calling party uses mobile user equipment 310 that is not GPS enabled, the call processing proceeds in a manner similar to that described in reference to FIG. 2 up to the point the MSC 226 attempts to determine 134 whether or not the mobile device 310 can provide GPS coordinates. Instead of receiving an indication 246 that the device is GPS enabled, the MSC 226 receives an indication 346 that the mobile device 310 is not GPS enabled. The MSC 226 then attempts to retrieve location information regarding mobile device 310 by some other means. For example, the MSC initiates a cellular triangulation procedure.

For instance, the MSC 226 uses the serving cell site 218 as a reference cell site. The MSC 226 identifies a plurality of additional cell sites e.g. 350, 354 neighboring the reference cell site 218. For instance, the MSC 226 identifies from 2 to about 5 additional cell sites in the vicinity of the mobile user equipment 310 of the calling party. The MSC 226 sends a plurality of Pilot Strength Measurement (PSM) data collection messages e.g. 358, 360, 362 to the cell sites e.g. 218, 350, 354 in the vicinity of the mobile device 310. In turn, the cell sites send Pilot Strength Measurement data collection messages (e.g. 364, 366, 368) to the mobile device 310. The mobile device 310 replies to each PSM data collection message (e.g. 364, 366,368) with a PSM response message 370,372, 374. Each of the plurality of cell sites e.g. 350, 354 and the reference site 218 relay the response messages 370, 372, 374 to the MSC 226. The MSC 226 uses signal strength or message delay parameter values associated with the response messages 370, 372, 374 to calculate a position of the mobile device 310 relative to the cell sites (e.g. 218, 350, 354). This relative position is combined with absolute positions of the cell sites (e.g. 218, 350, 354) available to the MSC 226 in order to determine an absolute position of the mobile device 310. Then, in a manner similar to that described in reference to FIG. 2, the calculated absolute position of the mobile device 310 can be included in a common location description request message 378 sent by the MSC 226 to the common location description look-up database 262. The calculated location coordinates included in the common location description request message 378 may be in a different format than used in the GPS based common location description request message 258 mentioned in reference to FIG. 2.

As described in reference to FIG. 2, the location look-up database 262 responds to the MSC 226 with the location identifier message 266 including some common description of the location of the mobile device 310 and the MSC 226 includes that description in an MSC_Network Origination message sent via the network 274 to the user equipment of the called party.

The procedures of the method 110 can be performed by a wide variety of network elements. The responsibility for carrying out the procedures of the method can be distributed among a variety of network elements or implemented in a more concentrated fashion by various combinations of hardware and software.

Figure 4:
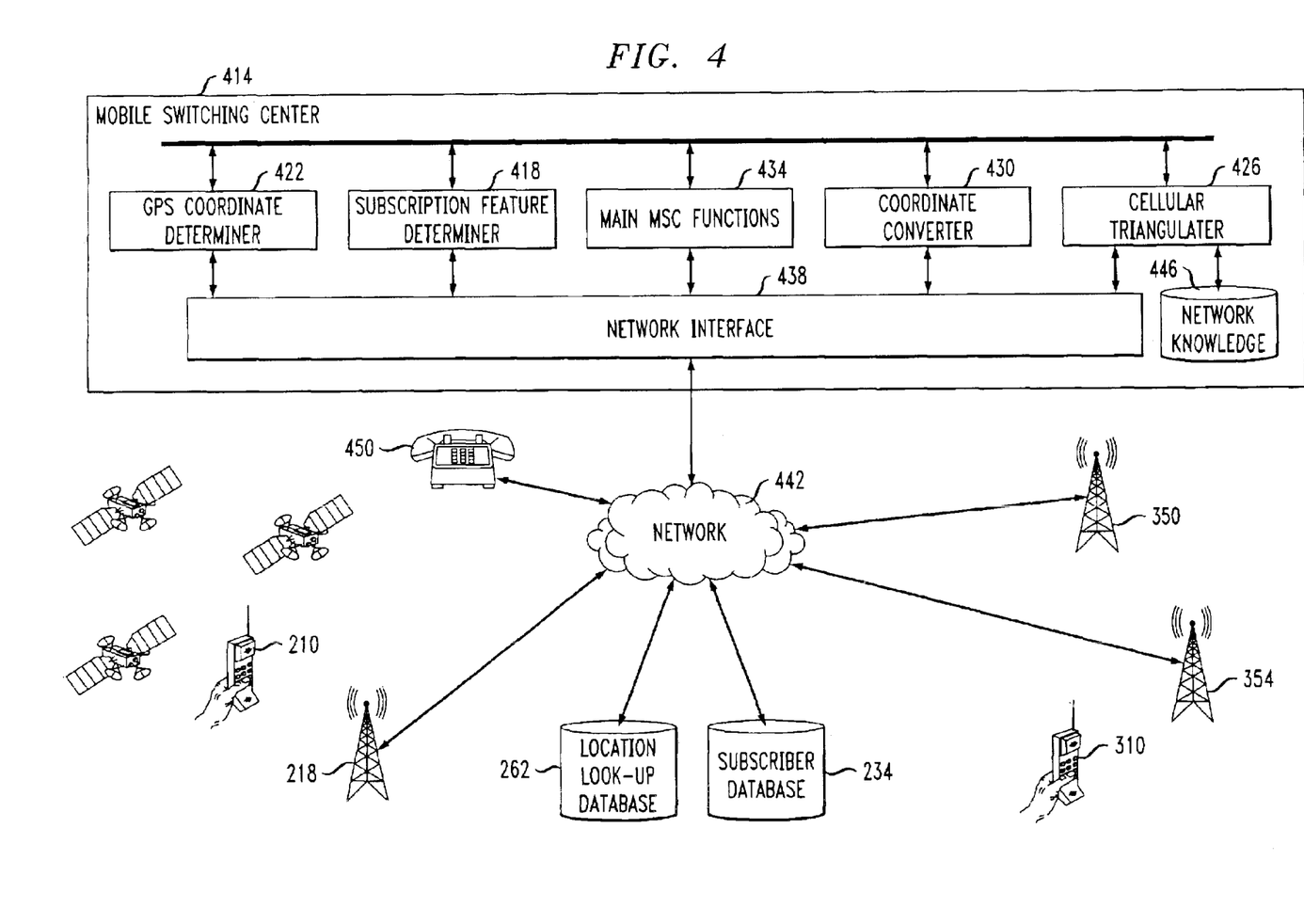
FIG. 4 is a block diagram of a system for providing location information regarding mobile user equipment of a calling party to user equipment of a called party.

Referring to FIG. 4, in one implementation, a mobile switching center 414 includes a subscription feature determiner 418, a GPS coordinate determiner 422, a cellular triangulator 426, and a coordinate converter 430. Of course, the mobile switching center 414 also includes main MSC functions 434 as are known in the art, and the MSC 414 includes a network interface 438 for communicating with a network 442 for carrying out the main MSC functions 434 and functions 422, 418, 430, 426 of the method 110.

The subscription feature determiner 418 may determine 122 if a called party subscribes to a location service and if so may determine 126 if the called party desires location information for a particular calling party. For example, the subscription feature determiner 418 may generate the appropriate messages 230 for retrieving a location feature activation bit and if applicable a list of parties or user equipment for which location information is desired. For instance, the subscription feature determiner 418 communicates with the subscriber database 234 by sending the appropriate messages 230 through the network interface 438 and through the network 442 to the subscriber database 234. Information from the subscriber database 234 is delivered to the subscription feature determiner 418 through the network 442 and the network interface 438. The subscription feature determiner 418 may analyze the list of user equipment to determine if the user equipment of the calling party is GPS enabled. The results of such a determination are communicated to the GPS coordinate determiner 422 and/or the cellular triangulator 426.

If the subscription feature determiner 418 informs the GPS determiner 422 that the user equipment of a calling party is GPS enabled (e.g. 210) the GPS coordinate determiner 422 generates and transmits a GPS location request message 250. The GPS location request message 250 is transmitted to the user equipment (e.g. 210) of the calling party through the services of the network interface 438, the network 442 and a serving cell site (e.g. 218).

Alternatively, if the subscription feature determiner 418 does not provide an indication as to whether or not the user equipment of the calling party is GPS enabled the GPS coordinate determiner 422 may generate a query 242 as to whether or not the user equipment of the calling party can provide GPS coordinates. The GPS query 242 may be transmitted to the subscriber database 234 through the network interface and intervening network 442. Alternatively, the GPS query 242 may be directed to the user equipment of the calling party. (e.g. 210, 310) via the network interface 438, network 442 and a serving base station (e.g. 218). If a response to the query indicates that the user equipment of the calling party is GPS enabled, the GPS coordinate determiner 422 generates and transmits a GPS location request message 250 as described above. If no response is received or if the response indicates that the user equipment of the calling party is not GPS enabled, the GPS coordinate determiner 422 so informs the cellular triangulator 426.

When informed that location information of the calling party is desired but that GPS coordinates are unavailable, the cellular triangulator 426 coordinates the collection of locating information with regard to the user equipment (e.g. 310)

of the calling party. For example, the cellular triangulator 426 generates and coordinates the transmission of a plurality of PSM data collection messages 358, 360, 362, 364, 366, 368. For instance, the cellular triangulator 426 accesses knowledge 446 of the mobile network to determine a location of the serving cell site 218 and the identity and location of a plurality of neighboring cells sites (e.g. 350, 354) that may be in range of the user equipment of the calling party (e.g. 310) for which location information is desired. The cellular triangulator 426 then initiates the transmission of the PSM data collection messages 358, 360, 362 to the serving cell site 218 in the plurality of neighboring cell sites 350, 354, respectively. In turn, the cell sites 218, 350, 354 transmit PSM data collection messages 364, 366, 368 to the user equipment of the calling party (e.g. 310). The user equipment responds to each PSM data collection message 364, 366, 368 with a PSM response message 370, 372, 374. Those messages 370, 372, 374 are relayed by the cell sites 218, 350, 354 to the cellular triangulator 426 through the services of the network 442 and network interface 438. The cellular triangulator 426 then uses information contained in the PSM response messages 370, 372, 374 and knowledge 446 about the locations of the cell sites 218, 350, 354 to determine a location of the user equipment of the calling party (e.g. 310). For example, the cellular triangulator 426 uses message delay information and/or signal strength information contained within the PSM response messages 370, 372, 314 to determine a relative position of the user equipment of the calling party to the cell sites 218, 350, 354. The cellular triangulator 426 combines that calculated relative position with the knowledge 446 available with regard to the absolute positions of the cell sites 218, 350, 354 to determine an absolute position or coordinates of the user equipment (e.g. 310) of the calling party.

Coordinate information, whether collected from a GPS location response message 254 received by the GPS coordinate determiner 422 or generated through cellular triangulation by the cellular triangulator 426 may be delivered to the coordinate converter 430. If so, the coordinate converter 430 generates a coordinate conversion message 258, 378 and transmits the coordinate conversion message 258, 378 to the common location description look-up database 262 through the services of the network interface 438 and the intervening network 442. The location look-up database 262 responds with a common description or location identifier 266 related to the position of the user equipment (e.g. 310) of the calling party. The location identifier 266 is transmitted to the coordinate converter 430 through the services of the network 442 and the network interface 438. The coordinate converter 430 generates an MSC_Network Origination message 270 and transmits the MSC_Network Origination message 270 to user equipment 450 of the called party. Again, the message 270 is transmitted through the services of the network interface 438 and the intervening network 442. The MSC_Network Origination message 270 includes the common description of the location of the calling party. For example, the location description is appended to or replaces caller ID information. The user equipment 450 of the called party may be a mobile or wired device. The location information may be displayed before the call is answered, may be communicated to the called party when the call is answered or at some point during the conversation, and/or may be logged for future reference. Alternatively, unconverted coordinate information may be included in the MSC_Network Origination message.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

We claim:

1. A method operative to include caller location information in information made available to user equipment of a called party, the method comprising:

receiving an origination message from user equipment of the calling party;

extracting called party identification information from the origination message;

determining that the called party subscribes to a caller location service based on the extracted called party identification information;

determining a latitude and longitude of the calling party;

determining a common description of a location of the calling party based on the latitude and longitude;

including the common description of the location of the calling party in a message; and transmitting the message including the common description of the location to the user equipment of the called party.

2. The method of claim 1 wherein determining that the called party subscribes to a caller location service comprises:

accessing user subscription information of a subscriber database of the called party.

3. The method of claim 1 wherein determining a latitude and longitude of the calling party comprises:

determining that the user equipment of the calling party includes a GPS receiver; and requesting GPS coordinates from the user equipment of the calling party.

4. The method of claim 1 wherein determining a latitude and longitude of the calling party comprises:

determining that the user equipment of the calling party does not include a GPS receiver; and requesting coordinates of the calling party user equipment from a reference cell cite of the user equipment of the calling party.

5. The method of claim 1 wherein determining a latitude and longitude of the calling party comprises:

determining that the user equipment of the calling party does not include a GPS receiver; and requesting coordinates of the calling party user equipment be determined by cellular triangulation.

6. The method of claim 4 further comprising:

transmitting a first PSMM_Request message from a first cell site to the user equipment of the calling party;

transmitting a first response to the first PSMM Request message;

determining a first delay from the first response;

transmitting a second PSMM_Request message from a second cell site to the user equipment of the calling party;

transmitting a second response to the second PSMM Request message;

determining a second delay from the second response;

transmitting a third PSMM_Request message from a third cell site to the user equipment of the calling party;

transmitting a third response to the third PSMM Request message;

determining a third delay from the third response; and, determining a relative position of the user equipment of the calling party to the first, second and third cell sites based on the first, second and third delays.

7. The method of claim 4 further comprising:

transmitting a plurality of PSMM_Request messages from a plurality of cell sites to the user equipment of the calling party;

transmitting a plurality of responses to the plurality of PSMM_Request messages;

determining a plurality of delays from the plurality of responses; and, determining a relative position of the user equipment of the calling party to the plurality of cell sites from the plurality of delays.

8. The method of claim 6 further comprising calculating an absolute position of the user equipment of the calling party from the relative position of the user equipment and known positions of the first second and third cell sites.

9. The method of claim 7 further comprising calculating an absolute position of the user equipment of the calling party from the relative position of the user equipment and known positions of the plurality of cell sites.

10. The method of claim 3 wherein determining a common description of a location of the calling party comprises:

receiving the GPS coordinates; and using the GPS coordinates as an index into a common location description database to determine at least one of an address, a city name, and a distance and heading from a landmark.

11. The method of claim 4 wherein determining a common description of a location of the calling party comprises:

receiving the coordinates; and using the coordinates as an index into a common location description database to determine at least one of an address, a city name, and a distance and heading from a landmark.

12. A method operative to include caller location information in information made available to user equipment of a called party, the method comprising:

receiving a call request from the calling party;

extracting called party identification information from the call request;

determining that the called party subscribes to a caller location service based on the extracted called party identification information;

verifying that the calling party is included in a list of potential calling parties for which the called party desires location information;

determining a latitude and longitude of the calling party;

determining a common description of a location of the calling party based on the latitude and longitude;

including the common description of the location of the calling party in a message; and transmitting the message including the common description of the location to the user equipment of the called party.

13. A method operative to provide caller location information to user equipment of a called party, the method comprising:

receiving an origination message from user equipment of the calling party;

extracting called party identification information from the origination message;

determining that the called party subscribes to a caller location service based on the extracted called party identification information;

determining if the user equipment of the calling party is GPS enabled;

requesting GPS coordinates from the user equipment of the calling party if the user equipment of the calling party is GPS enabled;

requesting cellular triangulation services be used to generate location information regarding the user equipment of the calling party if the user equipment of the calling party is not GPS enabled;

determining a common description of a location of the calling party based on the GPS coordinates or the generated location information;

including a representation of the common description of the location in a caller ID field of a message; and transmitting the message to the user equipment of the called party.

14. The method of claim 13 further comprising:

extracting calling party user equipment identification information from the origination message;

retrieving a list of potential calling party user equipment for which the called party desires location information;

comparing the extracted calling party user equipment identification information to entries in the list of potential calling party user equipment; and determining that one of the entries in the list matches the extracted calling party user equipment identification information.

15. The method of claim 13 wherein determining that the called party subscribes to a caller location service based on the extracted called party identification information comprises:

querying a subscriber database associated with the called party; and retrieving location feature subscription information regarding the called party.

16. The method of claim 13 wherein determining if the user equipment of the calling party is GPS enabled comprises:

extracting calling party user equipment identification information from the call request;

retrieving a list of potential calling party user equipment for which the called party desires location information, the list including GPS enablement status information regarding the potential calling party user equipment.

17. The method of claim 13 wherein determining if the user equipment of the calling party is GPS enabled comprises:

sending a GPS enablement query message to the user equipment of the calling party.

18. The method of claim 13 wherein requesting cellular triangulation services comprises:

transmitting a plurality of PSMM data collection messages to a respective plurality of cell sites within range of the user equipment of the calling party.

19. A system operative to include caller location information in information made available to user equipment of a called party, the system comprising:

means for receiving a an origination message from user equipment of the calling party;

means for extracting called party identification information from the origination message;

means for determining that the called party subscribes to a caller location service based on the extracted called party identification information;

means for determining a latitude and longitude of the calling party;

means for determining a common description of a location of the calling party based on the latitude and longitude;

means for including the common description of the location of the calling party in a message; and means for transmitting the message including the appended common description of the location to the user equipment of the called party.

20. The system of claim 19 wherein the means for determining that the called party subscribes to a caller location service comprises:

means for accessing user subscription information of a subscriber database of the called party.

21. The system of claim 19 wherein the means for determining a latitude and longitude of the calling party comprises:

means for determining that the user equipment of the calling party includes a GPS receiver; and means for requesting GPS coordinates from the user equipment of the calling party.

22. The system of claim 19 wherein the means for determining a latitude and longitude of the calling party comprises:

means for determining that the user equipment of the calling party does not include a GPS receiver; and means for requesting coordinates of the calling party user equipment from a reference cell cite of the user equipment of the calling party.

23. The system of claim 19 wherein the means for determining a latitude and longitude of the calling party comprises:

means for determining that the user equipment of the calling party does not include a GPS receiver; and means for requesting coordinates of the calling party user equipment be determined by cellular triangulation.

24. The system of claim 22 further comprising:

means for transmitting a first PSMM_Request message from a first cell site to the user equipment of the calling party;

means for transmitting a first response to the first PSMM_Request message;

means for determining a first delay from the first response;

means for transmitting a second PSMM_Request message from a second cell site to the user equipment of the calling party;

means for transmitting a second response to the second PSMM_Request message;

means for determining a second delay from the second response;

means for transmitting a third PSMM_Request message from a third cell site to the user equipment of the calling party;

means for transmitting a third response to the third PSMM_Request message;

means for determining a third delay from the third response; and, means for determining a relative position of the user equipment of the calling party to the first, second and third cell sites based on the first, second and third delays.

25. The system of claim 22 further comprising:

means for transmitting a plurality of PSMM_Request messages from a plurality of cell sites to the user equipment of the calling party;

means for transmitting a plurality of responses to the plurality of PSMM_Request messages;

means for determining a plurality of delays from the plurality of responses; and, means for determining a relative position of the user equipment of the calling party to the plurality of cell sites from the plurality of delays.

26. The system of claim 24 further comprising means for calculating an absolute position of the user equipment of the calling party from the relative position of the user equipment and known positions of the first second and third cell sites.

27. The system of claim 25 further comprising means for calculating an absolute position of the user equipment of the calling party from the relative position of the user equipment and known positions of the plurality of cell sites.

28. The system of claim 21 wherein the means for determining a common description of a location of the calling party comprises:

means for receiving the GPS coordinates; and means for using the GPS coordinates as an index into a common location description database to determine at least one of an address, a city name, and a distance and heading from a landmark.

29. The system of claim 22 wherein the means for determining a common description of a location of the calling party comprises:

means for receiving the coordinates; and means for using the coordinates as an index into a common location description database to determine at least one of an address, a city name, and a distance and heading from a landmark.

30. The system of claim 19 further comprising:

means for verifying that the calling party is included in a list of potential calling parties for which the called party desires location information.

31. A mobile switching center operative to provide calling party location information to user equipment of a called party, the mobile switching center comprising:

a subscription feature determiner operative to determine if the called party subscribes to a location service based on called party identification information extracted from an origination message;

a coordinate determiner operative to determine geographic coordinates of user equipment of a calling party if the subscription feature determiner determines that the called party subscribes to a location service;

a coordinate converter operative to determine a common description of a geographic location associated with the geographic coordinates determined by the coordinate determiner; and, a network interface operative to transmit the common description to the user equipment of the called party.

32. The mobile switching center of claim 31 wherein the coordinate determiner comprise:

a GPS coordinate determiner operative to send a request for GPS coordinates to the user equipment of the calling party and receive GPS coordinates from the user equipment of the calling party.

33. The mobile switching center of claim 31 wherein the coordinate determiner comprise:

a cellular triangulator operative to coordinate the collection of measurements associated with the user equipment of the calling party and the calculation of geographic coordinates associated with the location of the user equipment of the calling party based on the collected measurements.

34. The mobile switching center of claim 33 wherein the cellular triangulator is operative to collect the measurements associated with the user equipment through the transmission of a plurality of PSMM_Request messages.

* * * * *